J. L. & D. H. COLES.

FEEDING MECHANISM FOR SEWING-MACHINES.

No. 7,287. Reissued Aug. 29, 1876.

Witnesses

Otto Stupeland

Chas. Wahlers.

Inventors.

John L. Coles

David H. Coles by

Van Santwood & Hauff

Attorneys

N. PETERS, PHOTO-LITHOGRAPHER, WASHINGTON, D. C.

UNITED STATES PATENT OFFICE.

JOHN L. COLES AND DAVID H. COLES, OF NEW YORK, N. Y., ASSIGNORS, BY MESNE ASSIGNMENTS, TO COLES UNIVERSAL FEED SEWING MACHINE COMPANY, OF NEW YORK.

IMPROVEMENT IN FEEDING MECHANISMS FOR SEWING-MACHINES.

Specification forming part of Letters Patent No. 83,133, dated October 20, 1868; reissue No. 5,177, dated December 10, 1872; reissue No. 7,287, dated August 29, 1876; application filed August 7, 1876.

*To all whom it may concern:*

Be it known that we, JOHN L. COLES and DAVID H. COLES, both of the city, county, and State of New York, have invented a new and useful Improvement in Feeding Mechanisms for Sewing-Machines, which improvement is fully set forth in the following specification, reference being had to the accompanying drawing, in which—

Figure 1:
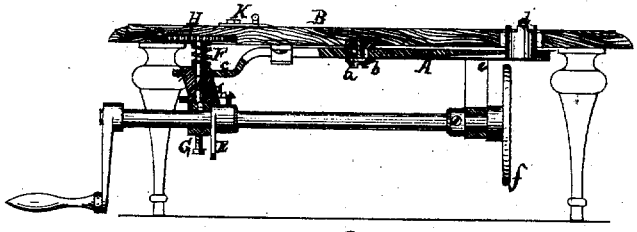
Figure 2:
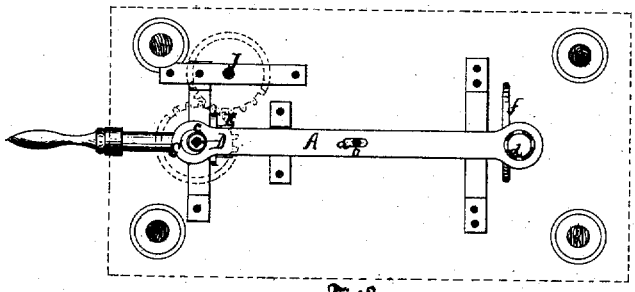
Figure 3:
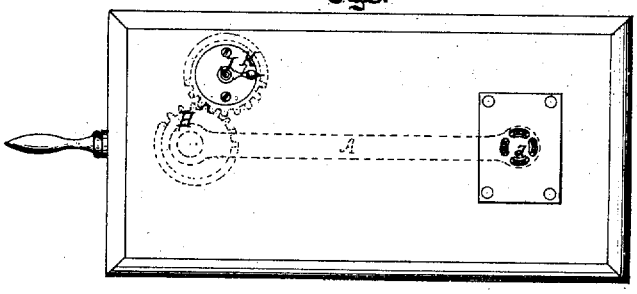

Figure 1 represents a sectional side elevation. Fig. 2 is a horizontal section just beneath the cloth-plate. Fig. 3 is a plan or top view.

Similar letters indicate corresponding parts.

This invention consists in the combination, in an under-feed sewing-machine, of a feed-bar which is free to move in the direction of its length, and also to assume an oscillating motion, and which carries the feed-dog, with a cam which acts on the feed-bar, and which cam can be adjusted so as to produce a feed-motion in any desired direction; also, in the combination, with the feed-dog and feed-bar of an under-feed sewing-machine, and with the cam which controls the direction of the feed, of an index and handle for adjusting the feed-controlling cam, and to indicate the direction in which the feed takes place; further, in the combination, with an adjustable cam, and with the feed-bar on which said cam acts, of a cam-supported feeding-surface.

In the drawing, the letter A designates the feed-bar, which is provided with a slot, *a*, through which passes a screw, *b*, which secures the same to the under surface of the cloth-plate B, so that said feed-bar is free to move in the direction of its length, and also to assume an oscillating motion. The rear end of the feed-bar forms a ring or eye, *c*, which embraces the cam C. This cam consists of a cylinder which is feathered in an oblique position on the arbor D, and it is subjected to the action of a cam-disk, E, and of a spring, F, which spring has a tendency to press the cam toward the face of the cam-disk. By the combined action of the cam-disk and spring, the cam receives a reciprocating motion through the eye of the feed-bar, compelling said feed-bar to assume a reciprocating or an oscillating motion corresponding to the obliquity and to the position of the cam. By a screw, G, the cam can be set close to or farther from the cam-disk E, and thereby the stroke of said cam, and consequently the length of the stitch, is changed. On the arbor D, which forms the guide for the cam, is mounted a gear-wheel, H, which gears into a cog-wheel, I, mounted on an arbor, J, which projects up through the cloth-plate B, and to the upper end of which is secured an index-hand, K, which sweeps over a dial-plate inserted into or marked on the cloth-plate. By turning this index-hand, the arbor D and the cam are turned, and the direction of the feed is changed, the index being adjusted in such a manner that it indicates the direction in which the feed takes place. The teeth *d*, which form the feed-dog, are connected to the feed-bar by means of a spring, *e*, which is exposed to the action of a cam or eccentric, *f*, so that said teeth receive a rising-and-falling motion, causing them to project, at suitable intervals, through openings in the cloth-plate or throat-plate. Said teeth are arranged in a circle surrounding the needle-throat, and they are so formed that they feed the fabric in any desired direction, the openings in the throat-plate through which they project being made of such a size that they (the teeth) can move the required distance in every direction.

By this arrangement a sewing-machine feed is obtained which can be properly termed a "universal feed," since it is capable of feeding in every direction of the compass, the direction of the feed being always under the control of the operator, by means of the index-hand K.

We are aware that reversible feeds, and also feeds capable of acting in four different directions, have heretofore been constructed; but our feed differs from those, since it is capable of acting in every desirable direction. We are also aware that sewing-machines with universal over-feeds have been in existence for a long time. These devices we do not claim.

What we claim as new, and desire to secure by Letters Patent, is—

1. In an under-feed sewing-machine, the combination, with a feed-bar which is free to move in the direction of its length, and also to assume an oscillating motion, and which carries the feed-dog, of a cam, which acts on the feed-bar, and which can be adjusted to impart to the feed-dog a motion in any desired direction, substantially as herein shown and described.

2. The combination, with the feed-dog and feed-bar of an under-feed sewing-machine, and with the cam which controls the direction of the feed, of a handle and index for adjusting the feed-controlling cam, and to indicate the direction in which the feed takes place, substantially as set forth.

3. The combination, with an adjustable cam, C, and with the feed-bar A, on which said cam acts, of a cam-supported feeding-surface, *d*, substantially as shown and described.

In testimony that we claim the foregoing we have hereunto set our hands and seals.

JOHN L. COLES. [L. S.]
DAVID H. COLES. [L. S.]

Witnesses:
W. HAUFF,
CHAS. WAHLERS.